United States Patent [19]

Strehl

[11] 4,449,218

[45] May 15, 1984

[54] ANALOG/DIGITAL TELECOMMUNICATION SUBSCRIBER STATION

[75] Inventor: Herbert Strehl, Munich, Fed. Rep. of Germany

[73] Assignee: Siemens Aktiengesellschaft, Berlin & Munich, Fed. Rep. of Germany

[21] Appl. No.: 309,190

[22] Filed: Oct. 7, 1981

[30] Foreign Application Priority Data

Oct. 24, 1980 [DE] Fed. Rep. of Germany ....... 3040263

[51] Int. Cl.$^3$ .............................................. H04J 1/08
[52] U.S. Cl. ..................................... 370/69.1; 370/76
[58] Field of Search .................... 370/69.1, 76, 71, 11; 179/170 NC

[56] References Cited

U.S. PATENT DOCUMENTS

| 2,744,159 | 5/1956 | Wright et al. ......................... 370/76 |
| 3,082,296 | 3/1963 | Caruthers ........................... 370/69.1 |
| 3,824,347 | 7/1974 | Sorber et al. ......................... 370/76 |
| 3,909,559 | 9/1975 | Taylor ........................... 179/170 NC |
| 4,375,015 | 2/1983 | Chambers ..................... 179/170 NC |

FOREIGN PATENT DOCUMENTS 2921019 8/1980 Fed. Rep. of Germany .
2916576 10/1980 Fed. Rep. of Germany .

OTHER PUBLICATIONS

IBM Technical Disclosure Bulletin, vol. 19, No. 7, Dec. 1976, "Hybrid Transmission System for Functional Digital Telephones", by Esteban, pp. 2571-2572.
"High-Frequency Data Transmission over Urban Telephone Networks", by Divnogortsev, Telecommun. & Radio Eng., Pt. 1, vol. 26, No. 6, Jun. 1972.
Gerke P. et al., "DTN, An All Digital Telephony Network . . . ", ISS '79, Session 40A: Communication of Data, pp. 773, 780.
Gerke P. et al., "The Digital Telephone Network (DTN) . . . ", Telecom Report, No. 2, 1979, vol. 4, pp. 254-261.
Moehrmann K. H., "Adaptive Equalization of Transmission Systems", Agard Conf. Proc., No. 103, May 1972, pp. 12-1-12-16.
Vry M. G., "The Design of a 1+1 System for Digital Signal . . . ", NFT (1980), No. 73, pp. 36-40.
Moehrmann K. H. "Applications of Adaptive Control in Transmission Systems", Frequenz, 28 (1974), 5, pp. 118-122, 155-161.
Siemens Druckschrift, "PCM-Die Pulscodemodulation . . . ", p. 15.

Primary Examiner—Douglas W. Olms
Attorney, Agent, or Firm—Hill, Van Santen, Steadman & Simpson

[57] ABSTRACT

An analog/digital telecommunication subscriber station is connectible to a two-wire line and comprises a frequency multiplexer and a frequency demultiplexer for grouping and fanning an analog communication channel covering the telephone band and a digital communication channel lying above the telephone band. The station further comprises a hybrid for connecting the two-wire line into a four-wire line. The subscriber station is particularly characterized in that the two-wire line is terminated by a broad-band hybrid which is proceeded in the transmission branch by a frequency multiplexer which groups at least the analog communication channel covering the telephone band and the digital communication channel lying thereabove, and is followed in the receiving branch by a frequency demultiplexer which fans at least the analog communication channel covering the telephone band and the digital communication channel lying above the telephone band. Various embodiments provide analog telephone operation, digital telephone operation, fast data operation, slow data operation, picture telephone service and a combination of analog and digital two-party line as various options.

20 Claims, 6 Drawing Figures

Analog/Digital Telecommunication Subscriber Station

ANALOG/DIGITAL TELECOMMUNICATION SUBSCRIBER STATION

BACKGROUND OF THE INVENTION

1. Field of the Invention

The present invention relates to subscriber stations, and is more particularly concerned with analog/digital subscriber stations.

2. Description of the Prior Art

In order to provide communication between two telecommunication stations, transmission devices are required between the stations which make a sufficiently noise-free signal transmission possible in both directions of transmission. To this end, for each direction of transmission there can be provided a separate transmission line which in the case of multiplex operation is, multiply exploited for a plurality of simultaneously-existing connections of two respective telecommunication stations. Such four-wire operation is preferably provided in high telecommunication network levels. In lower network levels, particularly in the area of the subscriber branch lines, signal transmission in duplex operation over two-wire lines is generally carried out. For the purpose of decoupling the transmission signals of the two transmission directions, a signal transmission in the discrete position method can be provided in that transmission channels which are separated from one another, either chronologically and/or in frequency position, are provided for the separate directions of transmission, and/or the separation of the transmission signals of the two transmission directions can be effected with the assistance of a hybrid in the form of a bridge circuit terminating the two-wire line, the hybrid transferring, for example, the two-wire line into the four-wire part of a subscriber terminal, and vice-versa. In order to achieve a complete decoupling of the receiving branch of the four-wire line outgoing from the hybrid from the transmission branch of the four-wire line incoming to the hybrid, the bridge circuit must be balanced, to which end it must contain a precise simulation of the input impedance of the two-wire line. In practice, the analog signal hybrids transferring the respective two-wire branch line into a four-wire voice current/audio current line branch which are presently provided at analog telephone subscriber stations which are standard today in the analog telephone network, contain a compromise simulation of the (frequency dependent) line impedance with sufficient accuracy only in a relatively narrow frequency range. This, however, is acceptable for analog telephone traffic.

Recent developments in telecommunications technology have lead to digital telecommunication systems which provide a conversion of the voice signals into digital signals, and vice-versa, for the telephone subscriber in the subscriber station and in which digital telephone connections can be completed by way of digital four-wire switching centers in uniform communication channels with a bit rate of, preferably, 64 kbit/s (per transmission direction), whereby a signaling connection for so-called "out-slot" signaling can constantly consist out of ("out-slot") the 64 kbit/s communication channel in an additional signal channel (subscriber signal channel) with a bit rate of, for example, 8 kbit/s (per transmission direction) (ISS'79, 773, 777; telcom report 2 (1979) 4, 254, 259). In addition to speech, text, data and images can also be transmitted; such a transmission and switching of the digital signals is to be expected in a future integrated services telephone network (ISDN).

At present, and in the near future, the two-wire switching centers standard today in the analog telephone network are employed, in the meantime, both for local switching centers and for private branch exchange (PBX) systems, analog telephone subscriber stations provided with an analog hybrid terminating the two-wire line branch being connected to the two-wire switching centers via two-wire branch lines respectively having a signaling circuit in the two-wire line branch. Upon introduction and further perfection of an integrated services digital network, a large number of such telecommunication systems will therefore already be in operation in the framework of the traditional analog telecommunication network, and the present invention discloses a way to be able to expediently exploit the advantages of digital communication methods.

In this context, it is already known (NTF 73, 1980, pp. 36-40) to superpose a 96 kbit/s digital communication channel lying above the telephone band upon the analog telephone channel of a telecommunication subscriber station connected to a two-wire branch line, in that the two-wire branch line is terminated by a diplexer to whose low pass filter branch the standard analog telephone device is connected and to whose high pass branch a digital transmitting/receiving circuit is connected via an adaptive hybrid in the form of a bridge circuit connected to an echo compensator. Such a telecommunication subscriber station seems relatively involved insofar as, in addition to a diplexer operating as a frequency multiplexer/demultiplexer, a respective hybrid to be realized by a bridge circuit must also be provided, both in the low pass branch and in the high pass branch, whereby the bridge circuit in the high pass branch which is too narrow-banded per se must be augmented by an echo compensator.

SUMMARY OF THE INVENTION

In contrast to the foregoing, the object of the present invention is to provide a relatively less involved telecommunication subscriber station for digital telephone communication in a digital communication channel lying above the telephone band, whereby analog communication is also enabled in the telephone band. The invention relates to an analog/digital telecommunication subscriber station connectible to a two-wire central office line, comprising a frequency multiplexer and a frequency demultiplexer for grouping and fanning an analog communication channel covering the telephone band and a digital communication channel lying, for example, above the telephone band. The system further comprises a hybrid for transforming a two-wire line into a four-wire transmitting/receiving line, particularly a voice current/audible current line branch, whereby the hybrid set terminating the two-wire central office line is preceded in the transmission line branch by a frequency multiplexer for bundling the analog communication channel covering the telephone band and the digital communication channel lying outside of the telephone band and is followed in the receiving line branch by a frequency demultiplexer for fanning at least the analog communication channel covering the telephone band and the digital communication channel lying outside, for example, above the telephone band. The telecommunication subscriber station of the present invention is characterized in that the voice current line branch of the telephone station is connected to the digital communication channel input of the frequency multiplexer by way of a coder and a digital signal transmission circuit for transmitting the signal pulses having a frequency spectrum lying above the telephone band and the digital communication channel output of the frequency demultiplexer is connected to the receiving audible signal branch of the subscriber station over a digital signal receiving circuit for receiving signal pulses having a frequency spectrum likewise lying above the telephone band and, then, by way of a decoder, being directly connected or respectively connected via transfer switches operated by way of manual signals and/or based upon the received digital signals. Given the direct connection, the transmission branch, particularly the voice current line branch, of a further telecommunication subscriber station combined with the first telecommunication subscriber station to form a two-party line system is connected to the analog communication channel input of the frequency multiplexer and the receiving branch, particularly the audible current line branch of the further telecommunication subscriber station is connected to the analog communication channel output of the frequency demultiplexer. Alternatively, given connection extending over the transfer devices, the output of a telephone channel modem belonging to a data terminal (slow data terminal) is connected to the analog communication channel input of the frequency multiplexer over corresponding, further transfer devices and the input of the telephone channel modem is connected to the analog communication channel output of the frequency demultiplexer over the corresponding further transfer devices and the audible line current branch of the subscriber station is alternately connectible over the transfer devices to the analog communication channel input of the frequency multiplexer while the audible current line branch of the subscriber station is alternately connectible over the transfer devices to the analog communication channel output of the frequency demultiplexer. A digital signal transmission circuit for emitting signal pulses having a frequency spectrum above the telephone band is connectible to the digital communication channel input of the frequency multiplexer and a digital signal receiving circuit for receiving signal pulses, likewise with a frequency spectrum lying above the telephone band, is assigned to the digital communication terminal and is connectible to the digital communication channel output of the frequency demultiplexer. According to a further feature of the invention, the frequency multiplexer or, respectively, demultiplexer can also group or fan a digital signal channel lying below the analog communication channel (for example, extending up to approximately 0.1 kHz) and/or an analog channel or a digital channel lying above the digital communication channel (extending, for example, from approximately 0.1 through 1 MHz) together with bundling or, respectively, fanning of the analog communication channel covering the telephone band (extending, for example, approximately from 0.3 kHz through 3.4 kHz) and the digital communication channel lying above the telephone band (extending, for example, approximately from 0.5 through 80 kHz).

The invention particularly exploits the fact that, due to recent developments of telecommunication engineering, a relatively simple and, at the same time, very broadband repeater-free hybrid is available with particular suitability for use within the scope of the invention, in which hybrid the two-wire line terminating impedance formed of a second resistor and a residual impedance is connected in parallel to the series connection of a current source controlled by the transmission line branch and resistor, and to which hybrid the series connection of two further resistances is connected in parallel by way of the series connection formed by the two resistors, whereby the receiving line branch is controlled by the voltage occurring between the junction point of the two resistances and the junction point of the two resistors. By so doing, a very broadband decoupling of the transmission signals of the two transmission directions is achieved, the decoupling being effective up to the megahertz range.

The invention offers the advantage of enabling respective analog communication in the (3 kHz) telephone channel and digital communication in a digital communication channel lying thereabove, for example, a 64 or 80 kbit/s channel in both transmission directions within the framework of a traditional analog telecommunication network with relatively slight circuit expense in that it simultaneously enables digital telephony, for example, in a 64 kbit/s communication channel, and (slow) data transmission in the analog telephone channel or, respectively, with a normal analog telephony mode, simultaneously provides a communication between (fast) digital communication terminals having, for example, a data flow of 60 or 80 kbit/s. The invention further enables a modern realization of a two-party line system which at the same time opens up possibilities of digital communication for the one two-party line system subscriber even within the framework of a traditional analog telecommunication network. In addition, the invention provides the further advantages of also opening up a way for a digital communication in a subscriber signal channel lying below the telephone band and/or for an analog communication, particularly a video communication, in an analog channel lying above the digital communication channel. It is also particularly advantageous in this context that the multiplexer can be reduced to a simple combinatorial circuit due to an expedient selection of line code and type of modulation so that the digital signal base band and the analog signal base band at least do not noticeably overlap.

According to a further feature of the invention, a digital signal transmission circuit emitting scrambled pseudo-ternary half-step signal pulses (AMI signal pulses) and/or a digital signal receiving circuit receiving such pulses, exhibiting no significant spectrum components in the voice frequency band, can be provided. A digital signal transmission circuit for emitting transmission signal pulses at specific points in time or, respectively, with a prescribed center of gravity of its frequency spectrum and a digital signal receiving circuit for receiving signal pulses at different points in time or, respectively, with a different center of gravity of its frequency spectrum can also be provided, this producing a further increase in decoupling.

According to another feature of the invention, the telecommunication subscriber station can be connected by way of the two-wire branch line to an input/output of a two-wire switching center and thus makes use of the broad-band characteristic of the cross-point switches of today's standard two-wire exchanges and, likewise, of the two-wire interoffice trunks presently installed, so that, given a corresponding broad-band characteristic of the subscriber extension circuits, as are provided in the case of so-called "choke-feed", as well, it is not only the general advantages of digital communication methods such as, for example, high degree of attenuation independence, constant and, under certain conditions, improved voice quality, and a simple realizability of various communication forms in an existing connection (mixed communication) which can be exploited in a traditional analog telephone network given further utilization of the signaling and call connection and disconnection methods standard therein, and the remaining exchange-oriented performance features, i.e. in the framework of already existing two-wire line switching centers and PBX systems but, rather, in addition to a telephone analog channel, for example, a subscriber signaling channel lying therebelow and a fast data channel lying thereabove, can also be offered. What is thereby advantageous is the avoidance of compatibility problems, since analog connections are possible from a telecommunication subscriber station designed and connected in the specified manner to pure analog telecommunication stations, as well as to telecommunication subscriber stations equipped in the manner specified above and, on the other hand, digital connections are possible to telecommunication subscriber stations equipped in the specified manner, as well as to pure digital subscriber stations, wherewith the possibility is provided, if need be, of only designing and connecting individual telecommunication subscriber stations of a traditional local exchange or of a PBX system in accordance with the invention.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
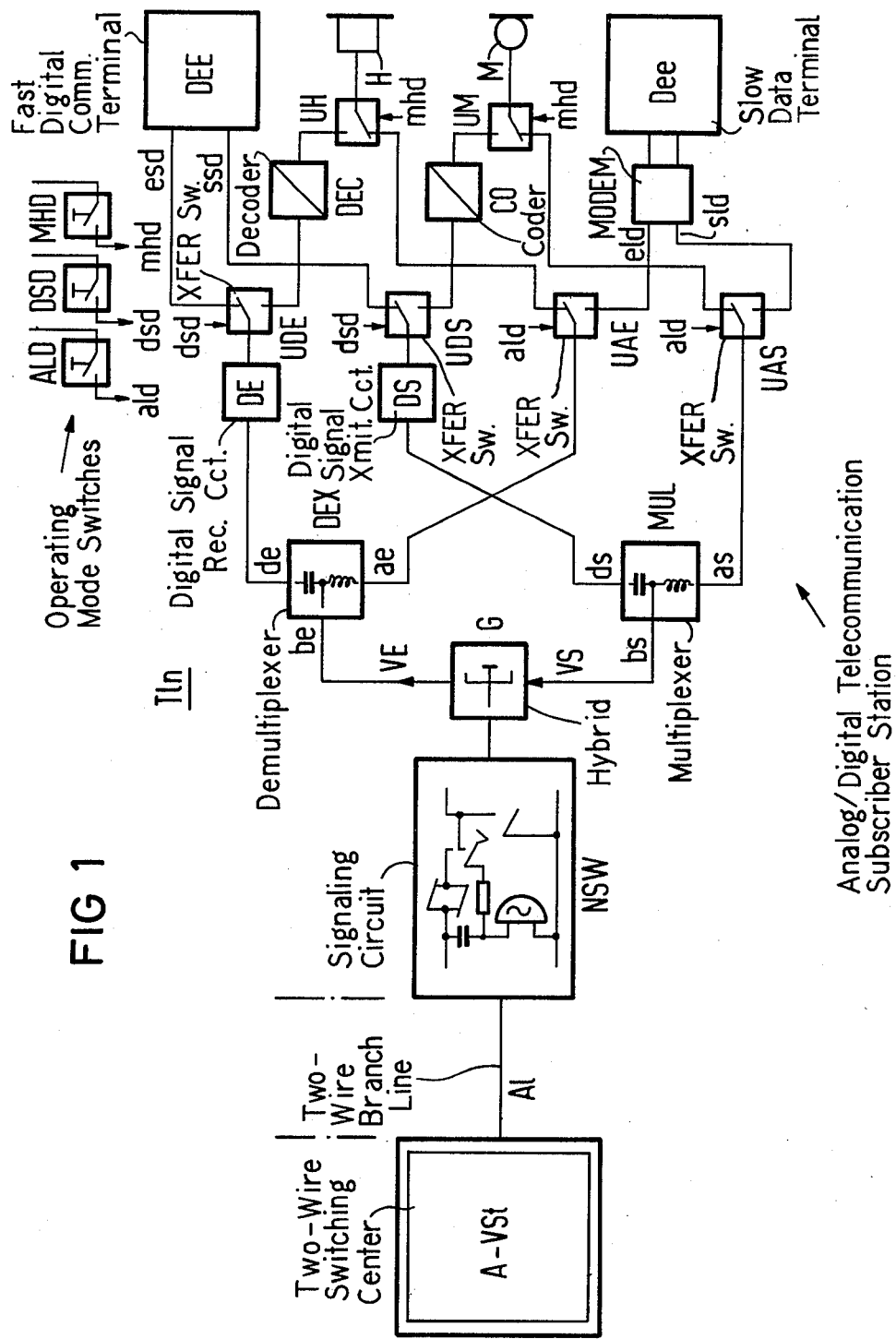
FIG. 1 is a schematic illustration of an exemplary embodiment of an analog/digital telecommunication subscriber station constructed in accordance with the present invention and illustrated in the framework of a telecommunication system.

In a scope necessary for an understanding of the invention, FIG. 1 illustrates a telecommunication system having an analog/digital telecommunication subscriber station constructed in accordance with the invention. The telecommunication system exhibits a two-wire switching center A-VSt (provided, for example, by a PBX system ESK 10-2 electronic or EMS 300), to which, via two-wire branch lines, not illustrated in detail in FIG. 1, telecommunication subscriber stations respectively having a signaling circuit connected to the two-wire branch line and a hybrid transferring a two-wire branch line into a four-wire transmitting/receiving line branch, particularly a voice current/audio current line branch, can be connected, whereby such telecommunication subscriber stations can be provided with a frequency multiplexer or, respectively, demultiplexer for grouping or, respectively, fanning an analog communication channel covering the telephone band and a digital communication channel lying above the telephone band, for the purpose of simultaneous analog communication and digital communication.

An analog/digital telecommunication subscriber station Tln is connected via a two-wire branch line Al to the two-wire switching center A-Vst, the analog/digital telecommunication subscriber station Tln comprising a broad-band hybrid G terminating the two-wire line branch Al, a signaling circuit NSW connected to the two-wire branch line Al; to that end, it is illustrated in FIG. 1 that the signaling circuit can be formed by a standard dial/call circuit NSW inserted into the two-wire branch line Al or, respectively, connected thereto in an iterative network. (Alternatively thereto, the telecommunication subscriber station can also be equipped with push button tone dialing, without this being illustrated in FIG. 1; the telecommunication subscriber station can also exhibit a display for displaying information, likewise not illustrated in detail in FIG. 1.)

Figure 2:
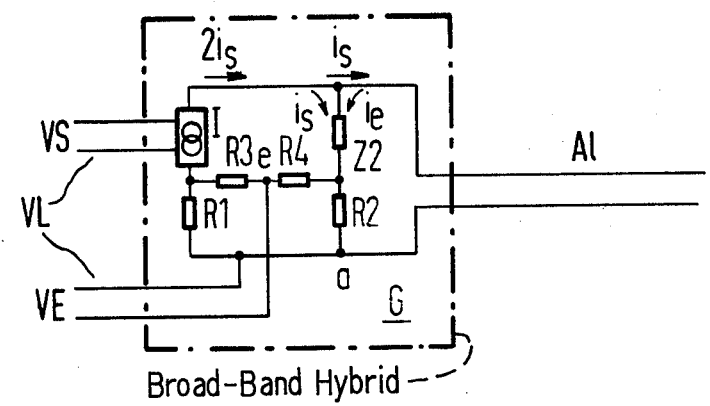
FIG. 2 is a schematic circuit representation of a broad-band hybrid.
Figure 3:
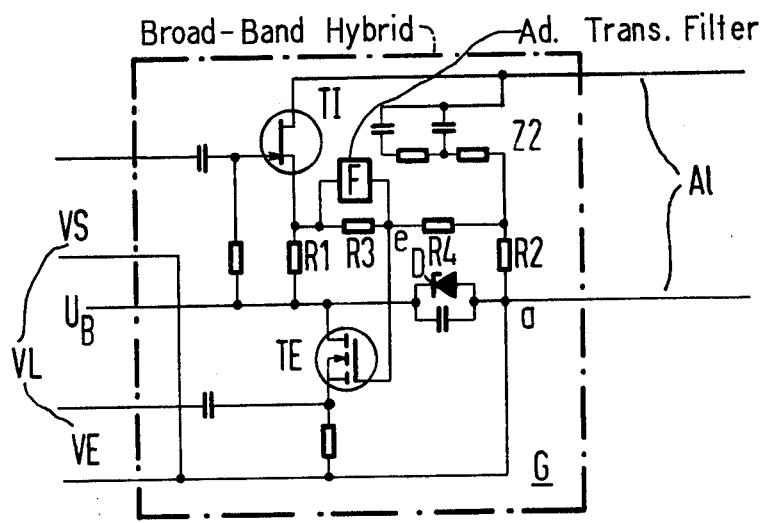
FIG. 3 is a schematic circuit diagram of another broad-band hybrid which is particularly suited for the analog/digital telecommunication subscriber station of the present invention.

Concerning the broad-band G, reference will be taken to FIGS. 2 and 3 of the drawings, which illustrate basic circuit details of such broad-band hybrids.

The hybrid G illustrated in the circuit diagram of FIG. 2 which is provided with a two-wire line terminating impedance Z2, R2 at least approximately simulating the characteristic impedance of the two-wire line Al, is provided for the connection of the two-wire line Al to a four-wire line VL which has a transmitting branch VS and a receiving branch VE, given simultaneous decoupling of the two four-wire line branches VS, VE from one another and first contains a series connection of a signal current source I, to whose control input the transmitting branch VS is connected, and a first ohmic resistor R1; connected in parallel to the series connection is the two-wire line terminating impedance formed by the series connection of a second ohmic resistor R2 whose resistance value may be at least approximately twice as great as that of the first ohmic resistor R1, and of a further impedance Z2. First terminals of the resistors R1, R2 and directly connected to one another at a junction a and to the one line lead of the two-wire line VE, at least in terms of alternating current, whereas the opposite terminals of the resistors R1, R2 are connected to one another via a series connection of two resistances R3, R4, which resistances R3 and R4 may be of the same size and, at the same time, large in comparison to the first resistor R1 and to the second resistor R2. The receiving branch VE of the four-wire line VL is connected to the junction e of the two resistances R3, R4 so that the receiving branch VE is connected across the point a, e.

In the circuit arrangement of FIG. 2, the transmission signal current $2i_s$ supplied by the current source I controlled proceeding from the transmitting branch VS of the four-wire line VL is distributed to the two-wire line Al and the two-wire line terminating impedance Z2, R2 in at least approximately equal parts $i_s$; at the same time, the received signal current $i_e$ supplied from the counter terminal—which, though not illustrated in greater detail in FIG. 2 can, however, fundamentally be likewise provided with a signal current source—via the two-wire line Al flows through the two-wire line terminating impedance Z2, R2. Therefore, a voltage arises at the resistor R2 of the two-wire line terminating impedance Z2+R2 which is composed of a component $i_e \cdot R2$ proportional to the received signal current and a component $i_s \cdot R2$ proportional to the transmission signal current. On the other side, the ohmic resistor R1 in series with the signal current source I is only traversed by the transmission signal current $2 i_s$, so that only a voltage $2 i_s \cdot R1$ proportional to the transmission current occurs. The receiving branch VE of the four-wire line VL connected between the junction point a of the two resistors R1, R2 and the junction point e of the two resistances R3, R4 is charged with a received signal corresponding to the voltage proportional to the received signal current which arises between the two junction points e and a. Thereby, the mutual compensation of the voltages proportional to the transmission signal current respectively occurring at the two ohmic resistors R1 and R2 is not dependent upon the fact that, as was first previously assumed, the resistance value of the second ohmic resistor R2 is precisely twice as great as that of the first ohmic resistor R1 and that the resistance value of the resistance R3 is precisely equal to that of the resistance R4; it suffices that $R2 \cdot R3 = 2 R1 \cdot R4$ is at least approximately true, whereby the resistance values of the resistances R3 and R4 should be large in comparison to the resistance values of the resistors R1 and R2, so that an influence of the receiving signal current $i_e$ on the transmission signal current source I via the resistances R3, R4 is negigible.

Given a two-wire line terminating impedance which blocks direct current, the parallel connection of the two-wire line terminating impedance Z2, R2 and the current source branch I, R1 can also be exploited as a feed shunt for a feed current supplied via the two-wire line Al, so that the signal current source I is traversed by the feed current supplied via the two-wire line Al. Thereby, the signal current source I can be formed by a transistor TI traversed by the feed current which is driven at its control electrode proceeding from the transmission branch VS of the four-wire line VL, as is illustrated in FIG. 3 of the drawings. Provided as the signal current source in the broad-band hybrid G of FIG. 3 is provided as temperature-stable and voltage-stable as possible by a field effect transistor TI, and n-channel depletion layer field effect transistor having preferably high steepness, its source resistor forming the aforementioned first ohmic resistor R1 with a resistance value of, for example, 50Ω. The field effect transistor TI can be controlled proceeding from the transmitting branch VS, for example, by a microphone amplifier circuit, via a coupling element formed with a capacitor of, for example, 10 nF and a resistor of, for example, 1 MΩ, so that the feed current is correspondingly modulated and, therefore, a corresponding transmission signal current is generated.

The two-wire line terminating impedance Z2, R2 according to FIG. 3 which is impermeable to direct current consists of the series connection of the second ohmic resistor R2 of, for example, 100Ω and the further impedance Z2 required according to the respective line type for the further simulation of the two-wire line characteristic impedance, the impedance Z2 being advantageously formed by an RC circuit, if need be by a RC continued fractional circuit, as is also indicated in FIG. 3 as a type of ladder circuit. The control segment of a transistor TE lies in the broad-band hybrid according to FIG. 3 between the junction point e of the two resistances R3, R4 which may respectively exhibit a resistance of, for example, 100 kΩ, and the circuit point a at which the two ohmic resistors R1 and R2 are directly connected to one another in terms of alternating voltage; in the example, the transistor TE is a depletion insulated gate field effect transistor (IGFET) having n-channel operation as a simple source follower at whose source resistor the received signal for the receiving branch VE of the four-wire line VL is tapped by way of a capacitor. Alternatively to the transistor TE, a degenerative operational amplifier can be provided, although this is not illustrated on the drawing, the operational amplifier lying at the receiving circuit point e with its inverting input and lying at the circuit point a with its other input, and its output connected to the receiving branch VE of the four-wire line VL; thereby, reactive effects of the received signal on the signal current source TE which may perhaps still remain are avoided.

As is also indicated in FIG. 3, an adaptive transversal filter F can be provided parallel to the resistance R3, the adaptive transversal filter supplying an echo compensation signal to the received signal circuit point e for further increasing the decoupling between the transmitting branch VS and the receiving branch VE of the four-wire line VL. In view of the fact that it is fundamentally known (for example, from FREQUENZ 28 (1974) 5, 118–122 and 155–161), to eliminate noise signals conditioned by the transmission signal and occurring in the receiving branch of a hybrid by means of addition or, respectively, subtraction of compensation signals, such as echo cancellation need not be discussed herein in detail.

A circuit element D traversed by the feed current supply via the two-wire line is inserted into the feed circuit between the terminals of the first resistor R1 and the second resistor R2 which are connected to one another in terms of alternating current, a local operating voltage $U_B$ (for the transmission and receiving circuits of the four-wire line or, respectively, for the four-wire line overall and for the hybrid itself) being tapped at the circuit element D. In the circuit arrangement according to FIG. 3, the circuit element is formed by a Zener diode; deviating from the illustration in FIG. 3, the Zener diode can, however, also be replaced by a circuit which only absorbs current when the operating voltage $U_B$ has reached an operating voltage rated value.

Returning now to FIG. 1, the broad-band hybrid G is preceded in the transmission branch VS by a frequency multiplexer MUL which at least groups an analog communication channel covering the telephone band and a digital communication channel lying above the telephone band and is followed in the receiving line branch VE by a frequency demultiplexer DEX which fans at least an analog communication channel covering the telephone band and a digital communication channel lying above the telephone band. In FIG. 1, the frequency multiplexer MUL and the frequency demultiplexer DEX are respectively illustrated as a low pass-/high pass diplexer, whereby the low pass input as or, respectively, output ae of the frequency multiplexer MUL or, respectively, demultiplexer DEX forms the analog communication channel input or, respectively, output and the high pass input ds or, respectively, output de forms the digital communication channel input or, respectively, output. The speech current line branch M of the telecommunication subscriber station Tln is connected to the analog communication channel input as of the frequency multiplexer MUL via transfer devices UAS, UM and the audio current line branch H of the telecommunication subscriber station Tln is connected to the analog communication channel ouput ae of the demultiplexer DEX via transfer devices UAE, UH. Conventionally, the element M is a telephone transmitter and the element H is a telephone receiver. The output bs of the frequency multiplexer MUL leads to the transmission line branch VS of the broad band hybrid G terminating the two-wire branch line Al and effecting the separation of the transmission signals of the two transmission directions, the receiving line branch VE of the broad-band hybrid G leading to the input be of the frequency demultiplexer DEX.

Therefore, the telecommunication subscriber station Tln can first, on the one hand, participate (given the switching state of the transfer devices UM, UAS; UAE, UH, illustrated in FIG. 1) in the telephone traffic in the standard manner (analog telephone operation) upon emission of dial pulses or, respectively, receipt of call current signals in the connection completion, transmission of analog speech signals in the base band position during the existence of a telephone connection as well as loop current interruption in the disconnection of the connection.

Connected to the digital communication channel input ds of the frequency multiplexer MUL is a digital signal transmission circuit DS for transmitting signal pulses with a frequency spectrum lying essentially above the telephone band, i.e. clearly above approximately 4.8 kHz, the output ssd of a digital communication terminal DEE which, for example, can be a matter of a 64 kbit/s data terminal, leading via a transfer device UDS to the digital signal transmission circuit DS; connected to the digital communication channel output de of the frequency demultiplexer DEX is a digital signal receiving circuit DE for receiving signal pulses with a frequency spectrum likewise lying above the telephone band, the digital signal receiving circuit DE, in turn, being connected by way of a transfer device UDE to the input esd of the digital communication terminal DEE.

In the framework of a telecommunication connection with the analog/digital telecommunication subscriber station Tln illustrated in FIG. 1, therefore, (given the switching state of the transfer devices UDS, UDE illustrated in FIG. 1), a fast data communication (digital data operation) can also occur in a digital communication channel, for example, a 64 kbit/s uniform channel, lying above the telephone band, occurring in addition to an analog telephone communication occurring in the standard telephone channel (approximately 0.3-3.4 kHz).

The digital signal transmission circuit can, for example, transmit pseudo-ternary half-step signal pulses, so-called half-bauded AMI (alternate mark inversion) signal pulses, as digital signal pulses which exhibit no significant spectrum components in the voice frequency band, to which end, as is specified elsewhere (German AS 2,916,576), it can comprise a read only memory which stores instantaneous values of the transmission signal pulses in encoded form and is driven in accordance with the digital signal supplied thereto, the read only memory supplying the corresponding instantaneous values in their encoded representation to a decoder which forms the corresponding signal transmission pulses therefrom. For the reception of corresponding signal pulses, the digital signal receiving circuit DE can comprise a regenerator, as is fundamentally known (for example, from the Siemens publication "PCM-Die Pulsecode-Modulation und ihre Anwendung im Fernmeldewesen", Page 15, FIG. 21) and in which, with the assistance of a clock recovery circuit, the received bit clock is derived from the received signal pulses, on the basis of which the decision times are defined in which the amplitude decision concerning the respective state value of the appertaining bit is respectively undertaken in the digital signal receiving circuit DE. Further, the digital signal receiving circuit DE can comprise a receiving signal converter—to be realized in the example with a rectifier—which converts the regenerated signals into corresponding $\Delta M$ or, respectively, PCM signals.

It is also possible to provide a digital signal transmission circuit DS for the transmission of signal pulses at specific points in time and/or, respectively, with a prescribed center of gravity of its frequency spectrum and to provide a digital signal receiving circuit DE for the receipt of signal pulses at other points in time and/or, respectively, with a different center of gravity of its frequency spectrum. The transmission bit clock, as is proposed elsewhere (German AS 2,921,019), can be derived from the received bit clock and be phase-shifted by half a bit time interval with respect thereto. However, for the details concerning a digital signal transmission circuit DS and a digital signal receiving circuit DE contained in the analog/digital telecommunication subscriber station Tln of FIG. 1 need not be explained here, since the same is not necessary for understanding the present invention.

Since, due to an appropriate selection of the line code employed in the digital communication channel, the digital signal base band and the analog signal base band at least do not noticeably overlap, moreover, differing from the illustration in FIG. 1, the multiplexer MUL can be advantageously reduced to a simple junction circuit, whereas the demultiplexer DEX is formed by a high pass-low pass diplexer.

When the transfer switches UAS, UAE are switched from the state illustrated in FIG. 1 into the opposite state, then the output sld in the analog/digital telecommunication subscriber station Tln of FIG. 1 is connected to the analog communication input as of the frequency multiplexer MUL and the input eld of a telephone channel modem MODEM, for example, of the telephone channel modem contained in a Hell telecopier HF 1048, belonging to a (slow) data terminal Dee is connected to the analog communication channel output ae of the frequency demultiplexer DEX.

Within the framework of an existing telecommunication connection, therefore, a slow data communication (analog data operation) can occur in the standard telephone band (circa 0.3-3.4 kHz) with the analog/digital telecommunication subscriber station Tln illustrated in FIG. 1 in addition to a fast data communication (digital data operation) occurring in the digital communication channel, for example, a 64 kbit/s common channel lying above the telephone band.

When the transfer devices UM, UDS; UDE, UH are switched from the state illustrated in FIG. 1 into the opposite switching state, then, at the transmission side, the voice current line branch M (telephone transmitter) of the telecommunication subscriber station Tln according to FIG. 1 is connected by way of the transfer device UM to a voice signal encoder CO given, for example, by means of a delta modulator or a pulse code modulator, which is in turn connected via the transfer device UDS to the digital signal transmission circuit DS leading to the digital communication channel input ds of the frequency multiplexer MUL, the digital signal transmission circuit DS being provided for the transmission of signal pulses with a frequency spectrum lying above the telephone band. At the receiving side, the digital signal receiving circuit DE for receiving signal pulses with a frequency spectrum likewise lying above the telephone band and connected to the digital communication channel output de of the frequency demultiplexer DEX is connected via the transfer device UDE to a speech signal decoder DEC which leads to the audio current line branch H (telephone receiver) of the telecommunication subscriber station Tln by way of the transfer device UH.

Within the framework of a telecommunication connection, therefore, a telephone communication (digital telephone operation) can occur in the digital communication channel, for example, a 64 kbit/s channel, lying above the telephone band with the analog/digital telecommunication subscriber station Tln illustrated in FIG. 1 in addition to a slow data communication (analog data operation) occurring in the standard telephone band (approximately 0.3–3.4 kHz). Thereby, moreover, the telephone communication can also proceed only in a 32 kbit/s subchannel of the 64 kbit/s channel carrying corresponding $\Delta M$ signals, whereas a second 32 kbit/s subchannel can be exploited for a type of communication, for example, remote plotting, which supports the telephone communication, which can be effected with the assistance of a subchannel multiplexer/demultiplexer which combines or, respectively, fans the telephone digital signals and the supporting communication digital signals; this, however, need not be further pursued here since the same is not required for an understanding of the invention.

As already indicated in FIG. 1, the switching of the transfer devices UDS, UDE; UAS, UAE; UM, UH can be triggered by means of manual signaling by corresponding operating mode transfer devices MHD, ALD, DSD. In addition, it is also possible to automatically switch the transfer devices according to the measure of a reception of digital signals via the two-wire line Al, in that, for example, a corresponding switching signal is emitted upon receipt of telephone digital signal pulses with the assistance of a monitoring circuit connected to the digital signal receiving circuit DE, on the basis of which switching signals the transfer devices under consideration are switched from "analog telephone mode" to "digital telephone mode". Thereby, the monitoring circuit is advantageously designed in such a manner that, on the one hand, a temporary nonoccurrence of telephone digital signal pulses as can occur in the course of an undisrupted call connection, is bridged and, on the other hand, given a longer outage of telephone digital signals due to transmission faults—or even given power line outage (which leaves today's standard remote feed of the analog telephone subscriber stations unaffected) the system is switched back to analog telephone operation—which, moreover, can also occur manually at any time with the assistance of the operating mode transfer switches. This, however, also need not be pursued in greater detail here, since it is not necessary for an understanding of the invention.

Insofar as, on the other hand, a change of operating mode is not required because, for example, only (slow) analog data operation is to be possible in the analog communication channel in addition to a digital telephone operation in the digital communication channel or because, for example, only (fast) digital data operation in the digital communication channel should be implementable in addition to an analog telephone operation in the analog communication channel, the transfer devices not required for that purpose can also be eliminated or, respectively, can be replaced by fixed connections. In this case, and referring to the illustration of FIG. 1, the fast data terminal DEE in the first example is also eliminated and the slow data terminal Dee is eliminated in the second example together with the appertaining modulator-demodulator MODEM, as well as the voice signal encoder CO and the voice signal decoder DEC, whereas the digital signal transmission circuit DS and the digital signal receiving circuit DE can then also be incorporated into the fast data terminal DEE.

In the exemplary embodiment of a telecommunication subscriber station Tln, constructed in accordance with the invention and illustrated in FIG. 1, an analog communication channel covering the telephone band and a digital communication channel lying above the telephone band are being grouped by the frequency multiplexer MUL or, respectively, are being fanned by the frequency demultiplexer DEX. Proceeding beyond that, however, it is also possible that the frequency multiplexer or, respectively, frequency demultiplexer groups or fans further transmission channels together with the analog communication channel covering the telephone band and the digital communication channel lying thereabove, to which end a simple low pass/high pass diplexer as indicated in FIG. 1 no longer suffices but, on the contrary, corresponding band pass filters must be provided for that purpose instead of or in place of the diplexer.

Then, the frequency multiplexer or, respectively, demultiplexer can, for example, group or, respectively, fan a digital signal channel lying below the analog communication channel and extending up to approximately 0.1 kHz and/or an analog channel lying above the digital communication channel and extending approximately from 0.1 Mz–1 Mz, or one or more further digital channels together with the analog communication channel covering the telephone band and extending approximately from 0.3 kHz through 3.4 kHz and the digital communication channel lying thereabove and forming, for example, a 64 or 80 kbit/s channel and, for example, extending approximately 4 kHz through 80 kHz. Also, the two-wire line Al connecting the telecommunication subscriber station Tln to the switching center making possible a broad-band through connection is terminated at the subscriber station by a broadband hybrid G which, as was already explained above, is capable of effecting a decoupling of the transmission signals of the two transmission directions up to the MHz range. In addition to a telephone digital operation—under certain conditions also auxiliary communication assisted—in the 64 kbit/s digital communication channel and a slow data operation, for example, facsimile operation, in the 3 kHz analog communication channel covering the telephone band, this also makes it possible for a digital telephone subscriber station equipped, for example, according to FIG. 4 with push button dialing and display, slow data terminal and video devices, to also carry out signaling from or, respectively, to the telecommunication subscriber station Tln in a digital signal channel lying below the analog communication channel, in that, for example (as described in greater detail in the German Letters Pat. No. 3,026,669) a carrier signal below the telephone band is superimposed in the switching center on the remote feed voltage, the carrier signal being modulated with a digital signal representing, in a coded manner, information to be made visible on a display at the subscriber station. Thereby, given appropriate selection of the modulation mode or, respectively, line code, the signals can be transmitted in the base band position both in the subscriber signal channel and in the analog communication channel covering the telephone band as well as, finally, in the 64 or 80 kbit/s digital communication channel lying thereabove. Video communication, for example, moving picture transmission in accordance with the picture telephone technique with a 1 MHz band width, is rendered possible in an analog signal channel lying above the 64 kbit/s communication channel.

In the exemplary embodiment according to FIG. 1, the analog/digital telecommunication subscriber station Tln is connected by way of the two-wire line Al to an input/output of a two-wire switching center AVSt. Alternatively thereto, the telecommunication subscriber station according to the invention, however, can also be connected to a four-wire switching center V-VSt (FIG. 4), to which end the two-wire line is also to be terminated at the switching center side by means of a corresponding broad-band hybrid, as is indicated in FIG. 4.

It should also be pointed out in this context, that, given a great line length of the two-wire line Al, a repeater circuit, respectively terminated itself by a broad-band hybrid, can also be inserted into the two-wire line Al or, respectively, can be interposed between the line and a two-wire switching center (A-VSt in FIG. 1) or can be preconnected to a four-wire switching center (V-VSt in FIG. 4), without this being illustrated in greater detail on the drawings. This likewise need not be pursued in greater detail here, since it is not necessary for an understanding of the invention.

Figure 4:
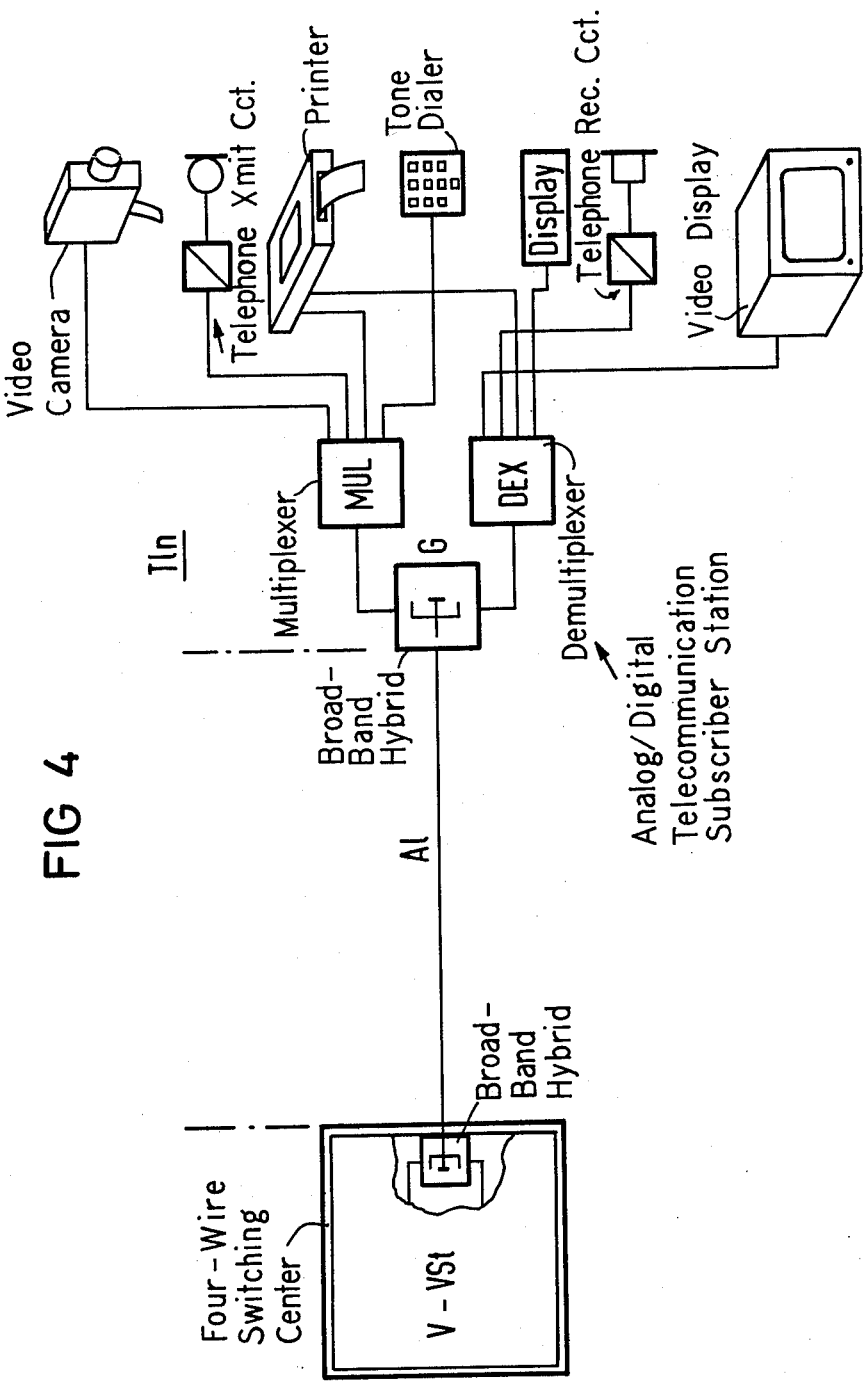
FIGS. 4 and 5 are schematic illustrations of exemplary embodiments of analog/digital telecommunication subscriber stations constructed in accordance with the present invention.

Deviating from the illustration of FIG. 4 showing a digital telephone subscriber station equipped with a tone dialer and display, slow data terminal and video devices, such terminal devices can also belong to different subscribers of a party line connection, whereby the individual subscribers of such a party line connection can also have access to the same communication services, for example, telephony. An example of this is illustrated in FIG. 5, in which a two-party line system Z1D is illustrated as comprising two telephone subscriber stations Tln I and Tln II, whereby circuit devices which coincide with corresponding circuit devices of the circuit arrangements according to FIG. 1 or, respectively, FIG. 4, are provided with the same reference characters.

Figure 5:
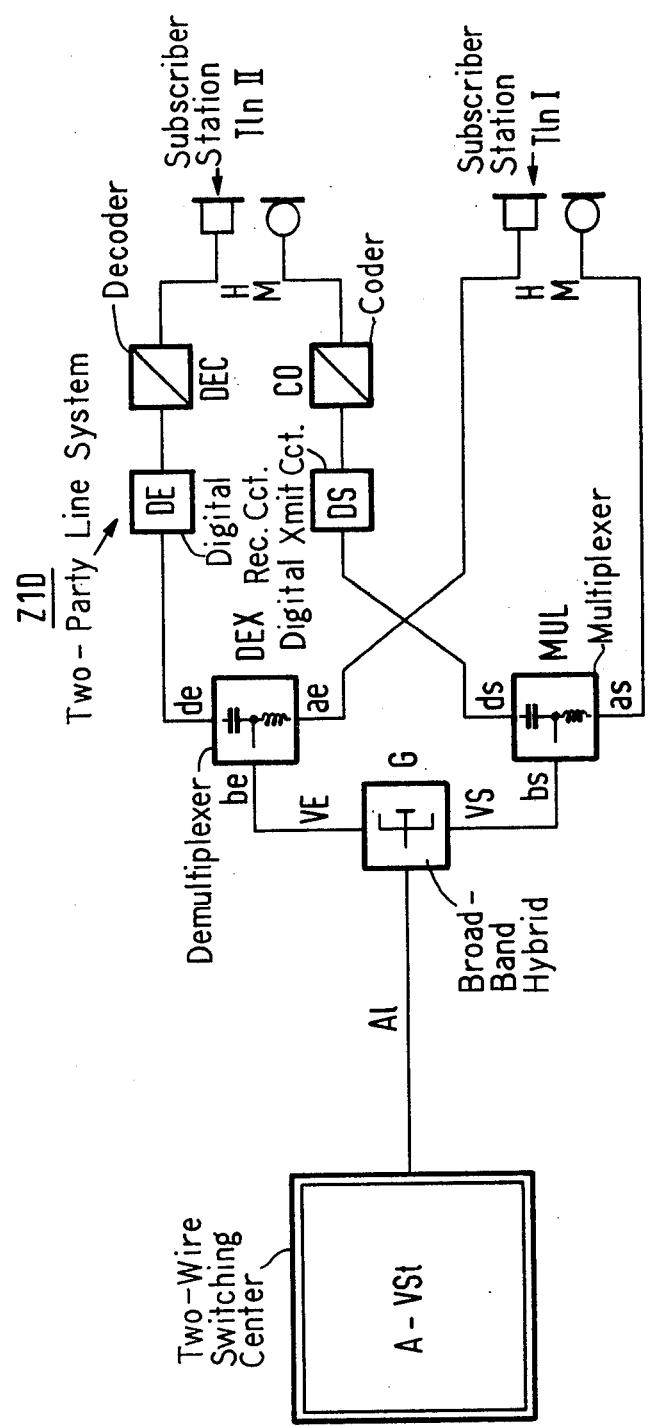

According to FIG. 5, the two-wire line Al connected to a switching center A-VSt is again terminated by a broad-band hybrid G which is preceded in its transmission line branch VS by a frequency multiplexer MUL grouping at least one analog communication channel covering the telephone band and one digital communication channel lying thereabove, and which is followed in its receiving branch VE by a frequency demultiplexer DEX fanning at least the analog communication channel covering the telephone band and the digital communication channel lying thereabove.

Connected to the analog communication channel input as of the frequency multiplexer MUL is the transmission branch of the telephone subscriber station Tln I formed by the voice current line branch M (transfer), the subscriber station Tln I being combined with the further telecommunication subscriber station Tln II to form the two-party line system Z1D. Connected to the analog communication channel output ae of the frequency demultiplexer DEX is the audio line branch H (receiver) of the telecommunication subscriber station Tln I forming the receiving branch. Therefore, the telecommunication subscriber station Tln I can participate in the usual manner in the telephone traffic in the analog communication channel covering the telephone band.

Connected to the digital communication channel input ds of the frequency multiplexer MUL is the transmission branch of the second telecommunication subscriber station Tln II of the two-party line system Z1D formed by the voice current line branch M (transmitter) conducted across a voice signal encoder CO, being connected, in particular, via a digital signal transmission circuit DS for the transmission of signal pulses with a frequency spectrum lying above the telephone band. The digital communication channel output de of the frequency demultiplexer DEX is connected via a digital signal receiving circuit DE for the receipt of signal pulses with frequency spectrum above the telephone band to the audio current line branch H (receiver) of the second telecommunication subscriber station Tln II of the two-party line system Z1D forming the receiving branch and being conducted across the speech signal decoder DEC. Therewith, the telecommunication subscriber terminal Tln II can then participate in the telephone traffic in the digital telephone mode in the digital communication channel, for example, a 64 kbit/s channel lying above the telephone band. The explanations provided above in conjunction with FIG. 1 or, respectively, FIG. 4 in this regard also apply for this purpose-as well as for the analog telephone operation of the telephone subscriber station Tln I of the two-party line system Z1D according to FIG. 5-in a corresponding manner, so that further explanations are not needed at this point. It should be mentioned in particular that, without the same being illustrated in detail in FIG. 5, both of the telephone subscriber stations Tln I and Tln II of the two-party line system Z1D can be remotely fed with the required operating voltage via the feed shunt of the broad-band hybrid G designed in accordance with FIG. 3.

Figure 6:
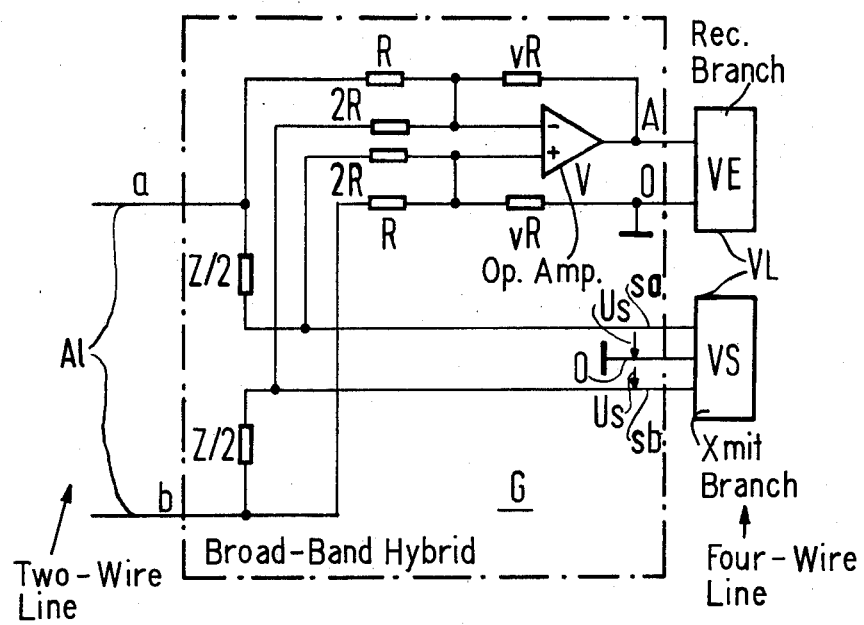
FIG. 6 is a schematic circuit diagram of a broad-band hybrid which is particularly suitable for the analog/digital telecommunication subscriber station of the present invention.

Turning now to FIG. 6, a basic circuit diagram of a further broad-band hybrid G is illustrated, which hybrid is available for an analog/digital communication subscriber station constructed in accordance with the invention.

In the hybrid G of FIG. 6, the two leads a, b of the symmetrical two-wire line Al are connected via the two halves of a two-wire line terminating impedance $Z/2 + Z/2$ at least approximately simulating the characteristic impedance of the two-wire line Al to the two output terminals sa, sb of the transmission branch VS of the four-wire line VL.

The transmission branch VS is likewise symmetrically designed, i.e., its two output terminals sa, sb carry the respective transmission signal voltage Us in antiphase with respect to one another (referred to a line symmetry point O carrying a reference potential). It is assumed that the internal resistance of the transmission branch occurring between the two output terminals sa, sb or, respectively, between a respective output terminal and the line symmetry point O be at least approximately negligibly small. When an overall transmission signal voltage 2Us occurs between the two output terminals sa, sb of the transmission branch VS of the four-wire line VL, the same is attenuated by two halves Z/2, Z/2 of the two-wire line terminating impedance in precisely such a manner that transmission signal potentials of the respective amount Us/2 arrive with opposite operational signs on the two two-wire line leads a, b.

Moreover, the two inputs (−) and (+) of an operational amplifier V leading to the receiving branch VE of the four-wire line VL are connected to the two two-wire line leads a, b via two resistors R. It is assumed that the two resistors have a high resistance value so that their influence on the termination of the two-wire line al is at least approximately negligible. By way of two resistors 2R having twice as high a resistance value, the two inputs (−), (+) of the operational amplifier V, moreover, are connected to the two output terminals sb, sa of the transmission branch VS of the four-wire line VL in an allocation which is the opposite of the allocation of the two-wire line leads a, b. Finally, the inverting input (−) of the operational amplifier is connected to its output and the non-inverting input (+) is connected to the line symmetry point O, being respectively connected via a resistor vR which has a resistance value which is v times as great as the first-mentioned resistors R. The operational amplifier output A and the line symmetry point O form the input of the receiving branch VE of the four-wire line VL. In response to received signal potentials +Ue/2 which arrive on the two-wire line leads a, b (proceeding from their distant end) and upon which the aforementioned signal transmission potentials ±Us/2 are superposed per se there, it is precisely only a pure received signal voltage v·Ue which occurs here, whereas the transmission signal components arriving at the input terminals of the operational amplifier V just respectively compensate one another (at least approximately).

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An analog/digital two-party line system for connection to a two-wire line, comprising:
   a frequency multiplexer including a multiplex signal output, an analog signal input and a digitial signal input and operable to multiplex analog signals in the telephone band and digital signals in a predetermined band outside of the telephone band;
   a frequency demultiplexer including an analog signal output, a digital signal output and a multiplex signal input, and operable to demultiplex analog signals in the telephone band and digital signals in the predetermined band outside of the telephone band;
   a broad-band hybrid including a two-wire input/output for connection to a two-wire line, a transmission branch connected to said multiplex signal output of said multiplexer, and a receiving branch connected to said multiplex signal input of said demultiplexer;
   a digital transmission circuit connected to said digital signal input of said multiplexer;
   a digital receiving circuit connected to said digital signal output of said multiplexer;
   a first telephone transmitter and a first telephone receiver respectively connected to said analog signal input and said analog signal output;
   an encoder and a decoder respectively connected to said digital transmission and receiving circuits; and
   a second telephone transmitter and a second telephone receiver respectively connected to said digital transmission and receiving circuits.

2. An analog/digital subscriber line system for connection to a two-wire line, comprising:
   a frequency multiplexer including a multiplex signal output, an analog signal input and a digital signal input and operable to multiplex analog signals in the telephone band and digital signals in a predetermined band outside of the telephone band;
   a frequency demultiplexer including an analog signal output, a digital signal output and a multiplex signal input, and operable to demultiplex analog signals in the telephone band and digital signals in said predetermined band;
   a broadband hybrid including a two-wire input/output for connection to a two-wire line, a transmission branch connected to said multiplex signal output of said multiplexer, and a receiving branch connected to said multiplex signal input of said demultiplexer;
   a digital transmission circuit connected to said digital signal input of said multiplexer;
   a digital receiving circuit connected to said digital signal output of said multiplexer;
   a first telephone transmitter and a first telephone receiver for respective connection to said analog signal input and said analog signal output of said multiplexer and said demultiplexer, respectively;
   an encoder and a decoder for respective connection to said digital transmission and receiving circuits;
   a second telephone transmitter and a second telephone receiver respectively connected to said analog signal input of said multiplexer and said analog signal output of said demultiplexer;
   a first data terminal;
   a modem connected to said first data terminal and including an input for connection to said analog signal output of said demultiplexer and an output for connection to said analog signal input of said multiplexer;
   a second data terminal including an input for connection to said digital receiving circuit and an output for connection to said digital transmission circuit; and
   switching means selectively operable to selectively connect said modem, said first telephone transmitter and receiver and said second data terminal to said multiplexer, said demultiplexer and said digital transmission and receiving circuits.

3. The subscriber line system of claim 2 wherein:
   said multiplexer and said demultiplexer include respective means for respectively grouping and fanning a digital signal channel located beow the analog communication channel.

4. The subscriber line system of claim 2, wherein:
   said multiplexer and said demultiplexer include respective means for respectively grouping and fanning another analog channel located above the digital channel.

5. The subscriber line system of claim 2, wherein:
said multiplexer and said demultiplexer include respective means for respectively grouping and fanning another digital channel located above the first-mentioned digital channel.

6. The subscriber line system of claim 2, wherein said hybrid comprises:
an impedance and a first resistor connected in series at a first junction and for connection across the two-wire line;
a current source connected to and controlled by current in said transmitting branch, and a second resistor connected in series therewith a second junction, said current source and said second resistor connected in parallel with said impedance and said first resistor; and
a third resistor connected to said junction and a fourth resistor connected to said first junction and to said third resistor at a third junction, said receiving branch including a first line connected to said third junction and a second line connected to said first and second resistors at a circuit point opposite said first and second junctions, whereby said receiving branch is controlled by the voltage occurring across said third junction and said circuit point.

7. The subscriber line system of claim 6, wherein:
said current source comprises a field effect transistor circuit including an n-channel depletion layer field effect transistor including a gate, a drain connected to said impedance and a source connected via said second resistor to a voltage source, and input means coupling the gate-source circuit to said transmission branch.

8. The subscriber line system of claim 6, wherein said impedance comprises:
a first end connected to said first resistor and a second end connected to said current source;
a plurality of resistors connected in series with said first end; and
a plurality of capacitors connected to respective ones of said plurality of resistors and to said second end.

9. The subscriber line system of claim 6, and further comprising:
an echo compensator connected across said third resistor.

10. The subscriber line system of claim 9, wherein:
said echo compensator comprises an adaptive transversal filter.

11. The subscriber line system of claim 6, and further comprising:
an insulated gate field effect transistor source follower circuit coupled to said receiving branch and connected to said third junction.

12. The subscriber line system of claim 6, and further comprising:
a degenerative operational amplifier including an inverting input connected to said third junction, a noninverting input connected to said circuit point, and an output connected to said receiving branch.

13. The subscriber line system of claim 6, and further comprising:
a Zener diode connected to said circuit point and to said second resistor; and a voltage source terminal, for connection to a voltage source commonly connected to said second resistor and said Zener diode.

14. The subscriber line system of claim 6, wherein said hybrid comprises:
a pair of mutually-anti-phase input terminals connected to said transmitting branch;
a pair of impedances connecting respective input terminals to respective lines of the two-wire line, each of said impedances approximately simulating half of the characteristic impedance of the two-wire line; and
an operational amplifier circuit comprising
an operational amplifier including an output connected to a conductor of said receiving branch, an inverting input and a non-inverting input, the other conductor of said receiving branch connected to a reference potential,
a pair of first resistors each having a resistance R, connected between respective lines of the two-wire line and said inverting and non-inverting inputs, respectively,
a pair of second resistors each having twice 2R of the resistance R of said first resistors, respectively connected between said input terminals and said inverting and non-inverting inputs, respectively, and
a pair of third resistors, having a resistance value vR, connected between the conductors of said receiving branch and said inverting and non-inverting inputs, respectively, of said operational amplifier where v is the amplification factor of said operational amplifier.

15. The subscriber line system of claim 2, wherein said switching means comprises:
a first transfer switch connected to said digital transmission circuit and to said input of said second data terminal and to said decoder;
a second transfer switch connected to said digital receiving circuit and to said output of said second data terminal and said encoder;
a third transfer switch connected to said receiver and to said decoder;
a fourth transfer switch connected to said analog signal output of said demultiplexer and to said input of said modem and said third transfer switch;
a fifth transfer switch connected to said transmitter and to said encoder; and
a sixth transfer switch connected to said analog signal input of said multiplexer and to said output of said modem and said fifth transfer switch.

16. The subscriber line system of claim 2, wherein:
said digital transmission circuit comprises means connected to said multiplexer to provide signal pulses at specific points in time; and
said digital receiving circuit comprises means connected to said demultiplexer to receive pulses at different points in time.

17. The subscriber line system of claim 2, wherein:
said digital transmission circuit comprises means connected to said multiplexer to provide signal pulses with a predetermined center of gravity of its frequency spectrum; and
said digital receiving circuit comprises means connected to said demultiplexer to receive pulses with a different center of gravity of its frequency spectrum.

18. The subscriber line system of claim 2, wherein:

said digital transmission circuit comprises means connected to said multiplexer and operable to transmit scrambled pseudo-ternary half-step alternate mark inversion (AMI) pulses; and said digital receiving circuit comprises means connected to said demultiplexer and operable to receive such AMI pulses.

19. The subscriber line system of claim 2, wherein:
the two-wire line is connected to a two-wire switching center.

20. The subscriber line system of claim 2, and further comprising:
another hybrid connecting the two-wire line to a four-wire switching center.

* * * * *